United States Patent

[11] 3,565,195

[72] Inventors Robert P. Miller
  Spring Valley, N.Y.;
  Marvin Miller, Teaneck, N.J.; Stephen P. Bailey, Mahopac, N.Y.
[21] Appl. No. 816,692
[22] Filed Apr. 16, 1969
[45] Patented Feb. 23, 1971
[73] Assignee Sibany Manufacturing Corporation
  Riverside, Conn.

[54] ELECTRICAL WEIGHING APPARATUS USING CAPACITIVE FLEXIBLE MAT
  11 Claims, 6 Drawing Figs.
[52] U.S. Cl. .................................................. 177/210, 177/253
[51] Int. Cl. .................................................. G01g 3/12, G01g 21/22
[50] Field of Search .......................................... 177/253, 210, 211

[56] References Cited
UNITED STATES PATENTS
3,277,704  10/1966  Eckard .................... 177/211X
3,314,493  4/1967   Kennedy ................... 177/210
3,332,506  7/1967   Bradfield .................. 177/210

Primary Examiner—Robert S. Ward, Jr.
Attorney—Pennie, Edmonds, Morton, Taylor & Adams ABSTRACT: Weighing apparatus is disclosed comprising electronic circuitry and a weighing mat adapted to be loaded by a force to be measured. The mat is composed of layers of electrically conductive elastomeric material separated by strips of dielectric elastomeric material to form an electrical capacitor whose capacitance varies linearly with the application of a load to the mat. The particular arrangement of the dielectric strips in the preferred embodiment serves to extend the effective linear range of capacitive variation of the mat. Electronic circuitry is also provided to measure the variation of capacitance of the mat when the mat is loaded and to give an indication corresponding to the magnitude of the load.

PATENTED FEB 23 1971
3,565,195
SHEET 1 OF 2
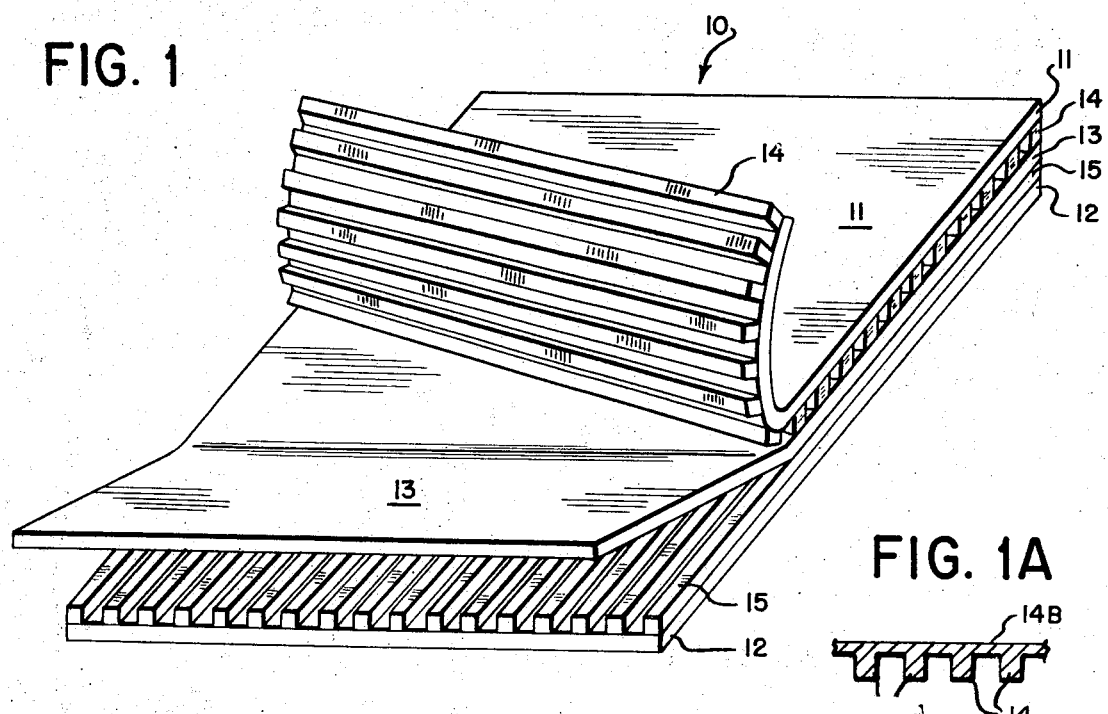
FIG. 1
FIG. 1A
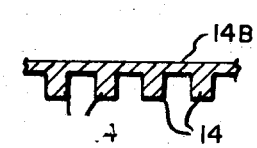
FIG. 1B
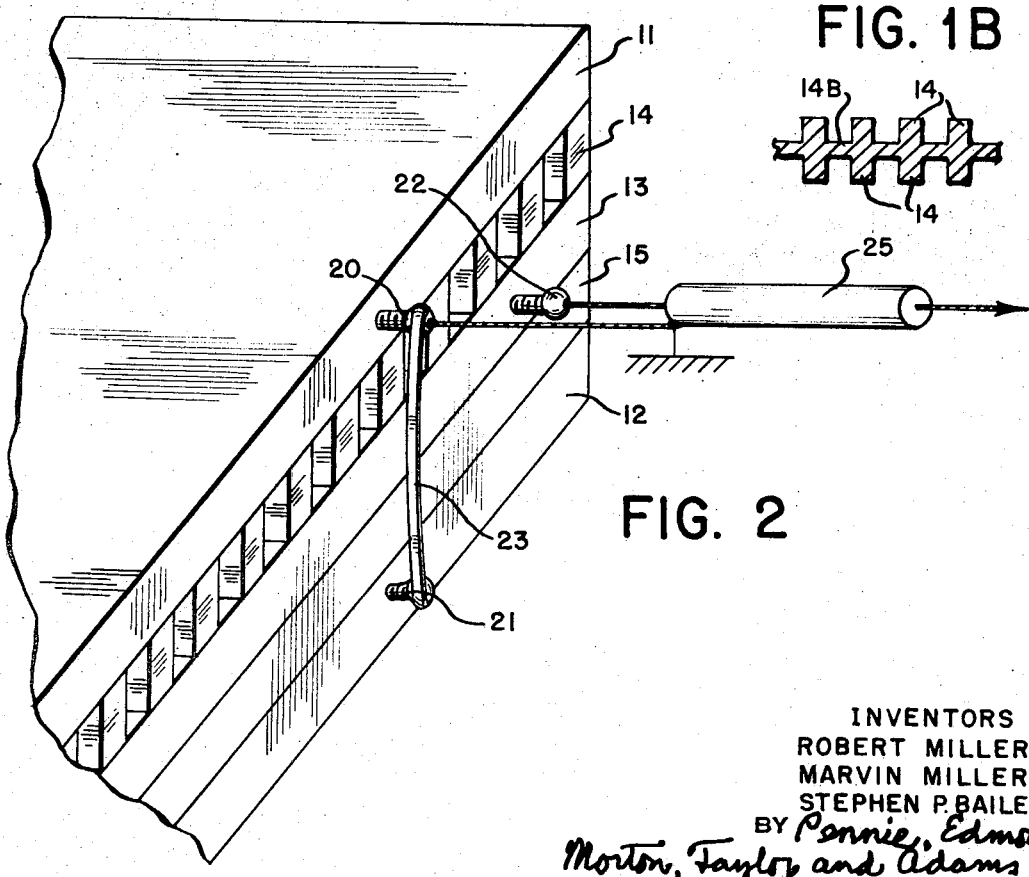
FIG. 2
INVENTORS
ROBERT MILLER
MARVIN MILLER
STEPHEN P. BAILEY
BY Pennie, Edmonds
Morton, Taylor and Adams
ATTORNEYS 3,565,195

ELECTRICAL WEIGHING APPARATUS USING CAPACITIVE FLEXIBLE MAT

DESCRIPTION OF THE INVENTION

This invention relates to weighing apparatus, and more particularly to weighing apparatus utilizing the variation in electrical capacity of a weighing mat adapted to be loaded by a force to be measured.

The weighing apparatus of this invention provides a thin, flexible weighing mat whose electrical capacitance varies in a linear manner with the magnitude of a weight placed on it. Essentially, the mat is formed of electrically conductive sheets or strata separated by elements of dielectric, nonconductive elastomeric material. The conductive strata form the plates of a capacitor, and as a weight is applied to the mat the elastomeric dielectric between the strata is compressed, the separation between the strata is reduced, and the capacitance of the weighing mat capacitor increases. Below a certain value of applied load the change in thickness of an elastomeric separator element under compression varies linearly with the intensity of the force applied to the element, and within that range of loading the capacitance of the mat varies linearly with the load. Above that range of loading, however, the thickness of the elastomeric element under compression varies in a nonlinear fashion with the applied load. In the preferred embodiment of the invention described hereinafter a particular arrangement of elastomeric dielectric elements is provided to extend the effective range of linear capacitive variation of the weighing mat.

The weighing mat of the preferred embodiment is formed as a sandwich of three electrically conductive strata separated by two elastomeric dielectric layers to create a two-section electrical capacitor. The dielectric layers, in turn, are composed of pluralities of spaced elastomeric separator elements either separate or joined, and the central conductive stratum is also of a deformable elastomeric material. When the mat of the preferred embodiment is loaded within the previously noted range of loads, each section of the capacitor varies linearly in capacitance with the applied load. When, however, the loading reaches the point at which the deformation of the dielectric elements would otherwise become nonlinear, the central conductive stratum begins to deform itself, tending to relieve the compressive stress on the dielectric separator elements and producing in effect an extended range of linear variation of mat capacitance with loading. The two-section form of the weighing mat also permits the electrical grounding of the two outer plates of the mat capacitor to shield the mat from the effects of stray capacitances in the vicinity.

SUMMARY OF THE INVENTION

The weighing apparatus of the present invention includes a weighing mat adapted to be loaded by a range of forces. The mat comprises at least two electrically conductive strata separated by a deformable dielectric layer having an effectively linear deformation characteristic and negligible elastic hysteresis when the mat is loaded by said range of forces. Additionally, circuit means connected to the conductive strata are provided to measure the variation of the electrical capacitance of the mat upon the application of a load to the mat.

The weighing mat of the preferred embodiment of the invention is composed of first and second electrically conductive strata separated by plurality of first dielectric elastomeric separator elements either separate or joined arranged in spaced relationship with each other. A third electrically conductive stratum is separated from the second conductive stratum by a plurality of second dielectric separator elements arranged in spaced relationship with each other. The second conductive stratum is formed of a deformable material.

These and other features and advantages of the present invention will become apparent when the following description is read in connection with the accompanying drawings.

DESCRIPTION OF THE DRAWINGS

A preferred embodiment of the present invention is illustrated in the drawings to which:

FIG. 1 is a perspective view showing the mechanical construction of the variable capacitor weighing mat;

FIGS. 1A and 1B are sectional views of elastomeric separator elements having a plurality of joined elements;

FIG. 2 is a sectional view of FIG. 1 illustrating the electrical connections to the separate layers of the weighing mat;

DESCRIPTION OF THE PREFERRED EMBODIMENT

Figure 3:
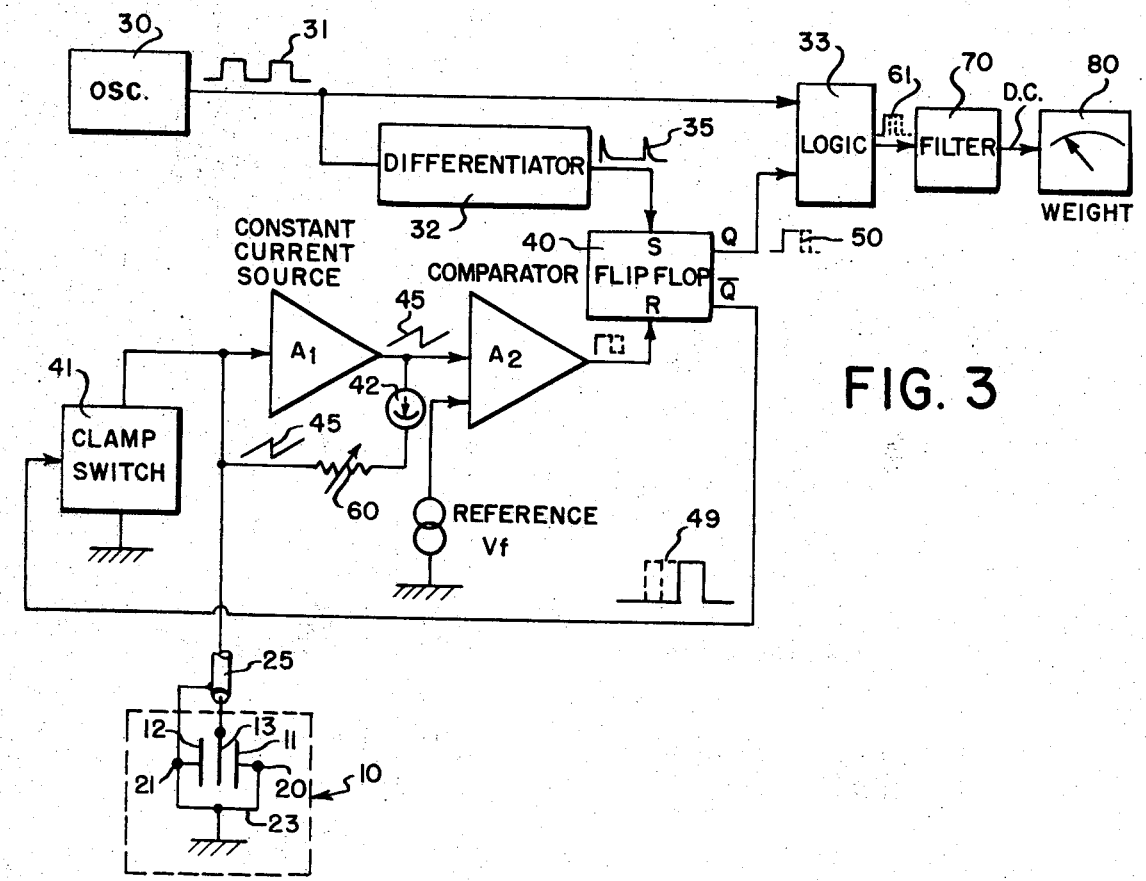
FIG. 3 is a simplified block diagram of an electric circuit suitable for use with the mat shown in FIGS. 1 and 2.

Referring to FIG. 1, there is shown therein a preferred embodiment of a weighing mat constructed in accordance with the teachings of the present invention. The mat 10 includes exterior conductive strata 11 and 12 and a centrally disposed conductive stratum 13 separated by insulative compliant layers 14 and 15 as shown in the drawing. Strata 11, 12 and 13 may comprise a compliant conductive rubber material having thickness of 0.055 inch and a Shore Durometer value of 60 such as that sold by Rabestos Company under Catalog No. N-2170-A. Dielectric separator layers 14 and 15 comprise a plurality of spaced strips of gum rubber bonded to the inner faces of the conductive strata 14 and 15 and are oriented so that the strips of one layer lie at right angles to the strips of the other layer. Strips one-sixteenth inch square in cross section made of pure gum rubber and spaced one-sixteenth inch apart have been found to perform satisfactorily in the weighing mat shown in FIG. 1. Suitable gum rubber is manufactured by Easthampton Rubber Co. and sold under Catalog No. HT-184.

As shown in FIGS. 1A and 1B, the spaced dielectric separator layers identified as 14 and 15 above are joined by a web 14B. In this form, the plurality of separator elements may be conveniently cast, extruded or machined as a single unit having the overall desired dimensions for a given weighing mat.

As shown in FIG. 2, the exterior conductive strata 11 and 12 are provided with electrical connecting terminals 20 and 21, respectively, and the central or interior stratum 13 is provided with an electrical connecting terminal 22. In operation, terminals 20 and 21 are preferably connected together by a conductive strap 23 to form one of the plates of a variable capacitor and terminal 22 is utilized for connection to the external electrical circuit illustrated in FIG. 3 through coaxial cable 25.

When the thin flexible mat 10 is mechanically loaded, the electrical capacitance between the conductive strata 11, 12 (connected together) and stratum 13 is caused to vary due to the compressive deformation of the insulative rubber layer strips 14 and 15. When the loading attains a level at which the deformation of the strips 14 and 15 becomes nonlinear with the applied load the central compliant conductive stratum 13 itself begins to deform, permitting those portions of the rubber strips 14 which are not directly opposite the rubber strips 15 to bulge downwardly toward the conductive stratum 12. Similarly those portions of strips 15 not directly opposite strips 14 tend to move upwardly toward stratum 11. It is believed that the effect of this mutual movement of portions of the separator strips 14 and 15 in cooperation with the deformation of the central stratum 13 is to tend to relieve the compressive stress on the rubber strips and effectively increase the range of linear capacitive variation of the mat 10. It has been found that the capacitance of a 2' by 2' mat constructed as shown in FIGS. 1 and 2 not only varied linearly as a function of an applied weight tested up to 1,000 pounds with a maximum loading of 125 p.s.i., but also that the capacitance change was independent of the mat area covered by the weight under those conditions.

In accordance with a preferred method of electrically measuring change of mat capacitance and hence the actual weight applied to the mat, a constant current source is repetitively applied to the mat capacitor plates to generate a fixed-frequency, fixed-amplitude linear sawtooth (i.e., linear ramp function) voltage, the time duration of which varies directly with mat capacitance.

The relationship between charging current, capacitor voltage and charging time is defined as follows:

$$\frac{C_m V_t}{I} = t_t \quad (1)$$

where:
$I$ = constant current value supplied to capacitor;
$C_m$ = mat capacitance;
$t_f$ = Time required to charge $C_m$ to $V_f$; and
$V_f$ = constant value of final voltage on capacitor. Since the values of $V_f$ and $I$ are maintained constant for all weight values, equation (1) 1 may be simplified as follows:

$$C_m K = t_f \quad (2)$$

where $K = V_f/I$, a constant. It can be seen from equation (2) that $C_m$ and $t_f$ are linearly related, i.e., as $C_m$ increases so does the charge time $t_f$. Thus capacitance change is proportional to change in weight which may be directly indicated by measuring change in charging time $t_f$. The latter is readily indicated by measuring the change in duty cycle of the ramp voltage developed on the loaded mat as will be explained in greater detail in conjunction with FIGS. 3 and 4.

Referring to FIG. 3, there is shown therein a simplified block diagram of electronic circuitry provided to electrically energize the variable capacitance weighing mat 10 with repetitive pulses of constant current and thereby detect changes in capacitance produced by weight on the mat. The circuit includes a stable oscillator 30 which generates a train of rectangular output pulses 31 of fixed repetition rate that are supplied to differentiator 32 and logic circuit 33. Differentiated clock pulses 35 are supplied to the S (set) input of flip-flop 40 which causes $Q$ output to go high and $\bar{Q}$ output 49 to go low. Switching of the $\bar{Q}$ output 49 to low causes a clamp switch 41 connected across coaxial cable 25 to open. With switch 41 in the open state, the capacitance of mat 10 is charged by a constant current I supplied by a bootstrap generator, including amplifier $A_1$, and constant voltage regulator 42 as shown.

A linear ramp voltage 45 is developed across the plates 11, 12 and 13 of mat 10 and as amplified by $A_1$ is supplied to the input of a bistable comparator $A_2$. At the time the amplitude of ramp voltage 45 exceeds a referenced voltage $V_f$ the output of comparator $A_2$ is switched to the high output state causing flip-flop 40 to reset. Upon reset of flip-flop 40, the $\bar{Q}$ output 49 is switched to high causing clamp switch 41 to close and discharge the capacitance of mat 10. At the same time the $Q$ output of 40 is switched to low. The resultant variable width, fixed frequency rectangular pulses 50 from the $Q$ output rate are supplied to logic circuit 33 which is provided to subtract the oscillator pulses 31 from the variable width pulses 50. In operation, a pulse width control 60 on the constant voltage regulator 42 is adjusted so that the clock pulses 31 provided by oscillator 30 are just equal in width to that of those pulses 50 occurring when there is no load on mat 10, producing cancellation and zero output from circuit 33 under that condition. As load is applied to the mat, the width of the $Q$ pulses 50 increases and the resultant variable width pulses 61 produced at the output of logic circuit 33 are supplied to an integrating filter 70 which produces a DC voltage proportional in amplitude to the width of pulses 61 and therefore to weight impressed on mat 10. Meter 80 is provided to measure the DC output voltage from filter 70 and directly indicate units of weight on a calibrated scale.

Figure 4:
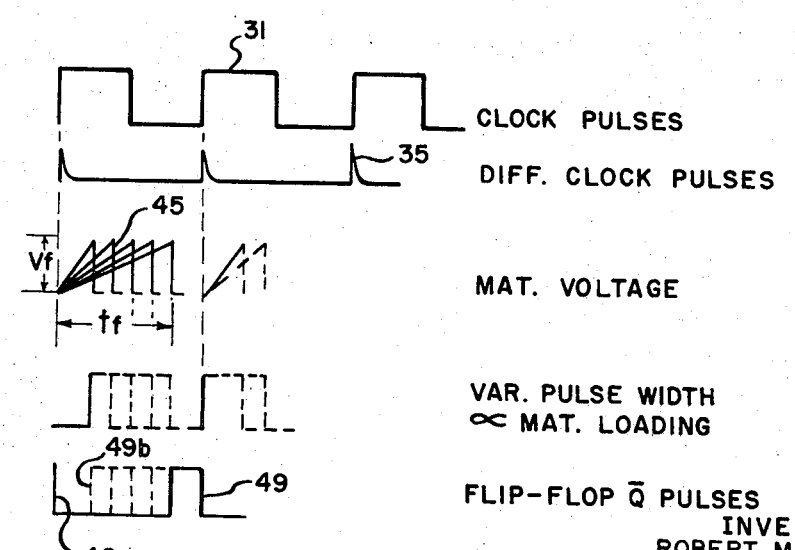
FIG. 4 is a diagram illustrating the time relationship between the various voltage waveforms appearing in the electrical circuit shown in FIG. 3.

Electrical voltage waveforms produced by various circuits in FIG. 3 are illustrated in time relationship in FIG. 4 and identified by the same numerals as in FIG. 3. Mat voltage 45 is a linear ramp or sawtooth voltage having (a) a constant maximum amplitude set by reference $V_f$, (b) a constant repetition rate set by oscillator pulses 31, and (c) a variable time duration $t_f$ determined by the capacitance mat 10 which is in turn determined by the weight that is imposed on the mat surface. The leading edge 49a of the $\bar{Q}$ pulses 49 is established by the setting of flip-flop 40 by the differentiated clock pulses 35, and the variable trailing edge 49b is established by the reset of flip-flop 40 by the output of comparator $A_2$. The capacitance of mat 10 is thus repetitively discharged by clamp switch 41 immediately after being charged to its maximum final voltage $V_f$ whereupon the clamp switch is again opened and the mat is again charged to $V_f$ in a time period determined by the mat loading.

Whereas a preferred embodiment of the weighing mat and cooperating electronic measuring apparatus have been described, it will be apparent that various modifications may be made within the scope of the invention both in the selection of suitable elastomer materials and in the capacitance measuring circuitry.

We claim:

1. Weighing apparatus comprising a weighing mat adapted to be loaded by a range of forces to be measured, said mat comprising at least two electrically conductive strata separated by a deformable dielectric layer having an essentially linear deformation characteristic when the mat is loaded by said range of forces, whereby the electrical capacity of the weighing mat varies in accordance with the magnitude of the load applied to said mat.

2. Weighing apparatus according to claim 1, further comprising means connected to said strata for measuring the electrical capacitance of said mat.

3. Weighing apparatus according to claim 1, further comprising means connected to said strata for measuring the change of electrical capacitance of the mat upon the application of a load to said mat.

4. Weighing apparatus comprising a weighing mat adapted to be loaded by a force to be measured, said mat comprising:
   a. a first electrically conductive stratum;
   b. a second electrically conductive stratum formed of a deformable elastomeric material;
   c. a plurality of first dielectric elastomeric elements arranged in spaced relationship with each other and separating said first and second strata;
   d. a third electrically conductive stratum; and
   e. a plurality of second dielectric elastomeric elements arranged in spaced relationship with each other and separating said second and third strata.

5. Weighing apparatus according to claim 4, wherein said first dielectric elastomeric elements comprise a first plurality of elastomeric strips arranged in spaced parallel relationship with each other, and said second dielectric elastomeric elements comprise a second plurality of elastomeric strips arranged in spaced parallel relationship with each other and in nonparallel relationship with said first plurality of elastomeric strips.

6. Weighing apparatus according to claim 4, further comprising means for electrically connecting said first and third strata, and circuit means connected to said first and second strata for measuring the electrical capacitance of the mat.

7. Weighing apparatus according to claim 4, further comprising means for electrically connecting said first and third strata, and circuit means connected to said first and second strata for measuring the change in electrical capacitance of the mat upon the application of a load to said mat.

8. Weighing apparatus according to claim 6, wherein said circuit means comprises constant current means for charging said mat to a predetermined voltage and timer means for measuring the time required to charge said mat to said voltage.

9. Weighing apparatus according to claim 7, wherein said circuit means comprises constant current means for charging said mat to a predetermined voltage, a timer means for measuring the time required to charge said mat to said voltage, and comparator means for comparing the times required to charge the mat to said voltage under two different loading conditions.

10. Weighing apparatus according to claim 9, further comprising automatic means for periodically connecting said constant current means to said mat, and switching means for periodically discharging said first and second strata when said constant current means is not connected to them.

11. Weighing apparatus according to claim 4, wherein said first and third strata are formed of a deformable, elastomeric material.